3,073,789
STABLE NON-ADHESIVE BUTADIENE-STYRENE CRUMB RUBBER CONTAINING A SILICONE OXIDE CONDENSATION POLYMER AND FINELY DIVIDED SILICA AND PROCESS FOR MAKING SAME
Herbert J. Goldstein, White Meadow Lake, Rockaway, N.J., and Paul V. Strother, Nederland, Tex., assignors to Texas-U.S. Chemical Company, New York, N.Y., a corporation of Delaware
No Drawing. Filed May 26, 1959, Ser. No. 815,793
11 Claims. (Cl. 260—29.1)

This invention relates to a process for preparing non-adhesive crumb rubber. The invention also relates to the novel crumb rubber composition produced thereby.

Synthetic rubbers in crumb form have found a growing market since their use permits the manufacturer or rubber fabricator to eliminate a shredding operation and elaborate feed devices in his manufacturing process. Crumb rubber arrives at the rubber fabricator in the form which is readily separable into smaller quantities and is readily weighed and proportioned without the cutting operation necessary when the rubber is received in the normal bale form. Since crumb rubber upon aging or storing under compression adheres to itself and forms a compacted mass that cannot be sub-divided without a cutting operation, it has been necessary to employ relatively large amounts of inorganic non-assimilable materials such as talc to assure the formation of a stable non-adhesive crumb rubber. The talc tends to degrade the physical properties of the crumb rubber and it has to be scrupulously removed prior to some uses of crumb rubber, for example, its use in rubber cements and as a component of high impact polystyrene. The present invention provides a method whereby a stable non-adhesive crumb rubber is formed using an additive that can be blended into the rubber without any serious adverse effect on the properties thereof.

In accordance with the process of the invention, a stable non-adhesive crumb rubber is formed by treating a butadiene-styrene copolymer—hereinafter also called SBR—prepared by a polymerization process using a fatty acid soap as an emulsifier with 0.01 to 1.5 weight percent silicone containing dispersed therein 5–25 weight percent silica particles. The process of the invention is not effective with butadiene-styrene copolymers prepared by polymerization with a rosin acid soap emulsifying agent since such copolymers are inherently too tacky to be converted to a stable crumb by the process of the invention. The butadiene-styrene copolymer containing the prescribed concentration of silica-containing silicone is a new composition of matter characterized by its ease of handling as a crumb and by the fact that the silica-containing silicone component becomes an integral component of the crumb and has no adverse effects on its properties.

The process of the invention has several obvious advantages over the use of talc for the preparation of crumb SBR rubber. In the first instance, a stable non-adhesive crumb is obtained with a smaller concentration of a silica-containing silicone than of talc. A concentration of about 0.5 weight percent silica-containing silicone is equivalent to or superior in effectiveness to 4 weight percent talc in producing a stable non-adhesive crumb rubber.

The second advantage flows in part from the effectiveness of small concentrations of the silica-containing silicone composition. This second major advantage is the fact that the silica-containing silicone has no adverse effects on the properties of the resulting crumb. The silica-containing silicone becomes an integral component of the crumb rubber and is compatible with all the proposed uses of crumb rubber. In contrast, talc can be considered a foreign material for some of the indicated uses of crumb rubber with the result that it must be scrupulously removed prior to the further processing of the crumb rubber.

The butadiene-styrene copolymers employed in the process of the invention comprise the whole range of butadiene-styrene rubbers wherein the butadiene content varies from 50–85 weight percent and the styrene content varies from 15–50 weight percent of the copolymer mixture. The process is effective with both hot and cold SBR copolymers and with the oil-extended SBR copolymers. The only limitation on the scope of the process of the invention with regard to the type of SBR copolymer is the requirement that the polymerization be effected with a fatty acid soap emulsifying agent. The type of coagulant employed whether it be salt-acid, glue-acid or alum has no adverse effect on the formation of stable, non-tacky crumb rubber by the process of the invention.

It is significant that silicones per se which have been widely used as mold release agents in rubber processing are of themselves ineffective in preparing a stable non-adhesive SBR crumb. The presence of a minor amount of finely-divided silica dispersed in the silicone is a critical factor in producing a non-tacky stable crumb. It has been theorized that the presence of the silica in the silicone increases the stiffness of the silicone coating with the silica particles acting, as it were, as an adsorbent for the silicone and preventing its migration into the interior of the crumb particles. The retention of the silicone on the surface of the crumb by the action of the finely-divided silica dispersed therein imparts a permanent increased resistance to adhesion to the crumb particles coated with the silica-containing silicones. In the absence of the dispersed finely-divided silica in the silicone, the silicone apparently migrates to the interior of the crumb rubber particles so that there is no permanent resistance to adhesion imparted to the SBR crumb.

The silicones useful in the present invention are liquid polymeric organic silicon oxide condensation products of the following general formula:

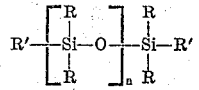

wherein R represents similar or dissimilar organic radicals such as alkyl, aryl, alkaryl, aralkyl and heterocyclic radicals and R' is either a hydroxyl radical or one of the aforementioned organic radicals and $n$ is an integer having a value of 1 or above and preferably between 4 and 20. The preparation of silicones of this nature is well-known in the art. Silicones of varying viscosities are produced by varying the chain length and nature of the radicals attached to the silicone atom in the above general formula. Although the organic radicals in the above formula are usually hydrocarbyl radicals, various substituents such as halogen atoms and particularly chlorine, the hydroxyl radical, nitrogen-containing radicals such as the nitro and amino radicals and sulfur-containing radicals such as the sulfonic acid and the mercapto radical can be substituted on the organic radicals in the foregoing formula, particularly on aromatic radicals.

Examples of typical silicones are dimethyl silicone, methylphenyl silicone, ethylbutyl silicone, methylcyclohexyl silicone, dicyclohexyl silicone, diphenyl silicone, chlorophenylmethyl silicone, hydroxyphenylmethyl silicone, phenylisopropyl silicone, tolylbutyl silicone, tolylamyl silicone and chlorophenylethyl silicone. Silicones containing simple organic radicals such as ethyl, methyl, and isopropyl groups are preferred silicones for use in the process of the invention. These compounds terminate either in hydroxyl radicals or in hydrocarbyl radicals.

The silica dispersed in the silicone has an average particle diameter between 0.01 and 0.1 micron with particle diameters of the order of 0.015 to 0.03 micron being preferred. A particularly preferred silica is an airborne silica produced by hydrolysis of silicon tetrachloride and having an average particle size about 0.02 micron.

The finely-divided silica is dispersed in the silicone in a concentration falling between about 5 and 25 weight percent of the silicone with the normal concentration falling between 10 and 20 weight percent of the silicone. It has been found that a silicone-containing dispersion of 15% airborne silica of 0.02 micron average particle size is particularly effective in the formation of non-adhesive non-tacky crumb rubber.

The silica-containing silicone is added to the crumb SBR rubber in a concentration between 0.01 and 1.5 weight percent of the crumb rubber. The optimum concentration appears to fall in the range of 0.1 to 1.0 weight percent since there appears to be a decrease in effectiveness as the concentration of silica-containing silicone increases above the 1.0 weight percent level. A concentration of 0.5 weight percent has proven particularly effective.

The silica-containing silicone is applied to the crumb rubber either per se or in the form of an aqueous emulsion. A silica-containing silicone emulsion is conveniently added to a SBR wash tank. A convenient emulsion for applying the silica-containing silicone comprises about 65% water and 35% silica-containing silicone, the dispersed silica constituting about 15% of the silicone component. The silica-containing silicone per se is usually sprayed onto the surface of the crumb during the drying operation.

The effectiveness of the silica-containing silicone in comparison with talc, silicones, and other non-adhesive agents in producing a stable non-tacky SBR crumb was demonstrated in the following test: Crumb was placed in a graduated cylinder under a compression weight of 0.4 lb./sq. in. which corresponds approximately to the weight encountered when SBR is stacked 3–4 bales in height. The crumb is maintained under this compression load for one hour at 150° F. Comparative data indicated that these accelerated conditions simulated one week of actual storage at 100° F. A sieve analysis was run on the crumb before and after compression and the average increase in particle size was determined. When the increase in particle size was large, the crumb was termed unstable. When the increase in particle size was small, the crumb remained fairly free flowing and was regarded as stable. The percent increase in particle size measured the effectiveness of the various agents in producing a stable non-tacky crumb.

*Example 1*

Solid Synpol 1012, a non-staining hot polymer sold by Texas-U.S. Chemical Co. and comprising approximately 23 weight percent bound styrene and prepared by fatty acid soap polymerization and having a Mooney viscosity (ML+4 at 212° F.) of 95–115, was ground in a mill to prepare a free flowing crumb having a particle size of 0.06 to 0.08″. This material was treated with various anti-stick agents with talc being applied in the usual manner to the dried crumb and the silicone materials being applied in the form of approximately 35 percent aqueous emulsions to once-washed crumb. The results obtained with the different agents in the above-described test are shown in Table I.

TABLE I

| Additive | Concentration, Weight Percent | Percent Increase in Average Particle Size |
|---|---|---|
| None | | 94 |
| Talc | 4 | 3.3 |
| Dimethyl silicone | 2 | 20.3 |
| Copolymer of dimethyl siloxane and diphenyl siloxane | 0.15 | 24.1 |
| Dimethyl silicone containing 15% 0.02 micron silica | 0.15 | 7.0 |

The data in the foregoing table indicate that the silica-containing silicone and talc were significantly more effective than silicones in increasing the stability of the crumb. It is significant that the concentration of silica-containing silicone required to achieve a suitable stability is only a fraction of the percentage of the talc required. As indicated previously, the use of 4 weight percent talc creates a dust problem, adds an insoluble ingredient which materially changes the physical properties of the rubber and prevents its solution in the formation of rubber cements. The effective small concentration of silica-containing silicone is free from such problems since the material is completely dispersed in the crumb, does not create a dusting problem and has no adverse effect on the physical properties of the resulting product.

In Table II there is shown the effect of varying concentrations of silica-containing silicone on the stability of another SBR crumb. In this test, Synpol 1006, a non-staining hot polymer prepared with a fatty acid soap emulsifying agent and coagulated with salt-acid and containing approximately 23 percent bound styrene, was ground to approximately 0.1″ particle size crumb. Varying concentrations of silica-containing silicone were added in the form of a 35 percent aqueous emulsion during washing of the crumb. The following results were obtained in the above-described test.

TABLE II

*Effect of Concentration of Silica-Containing Silicone on the Stability of Crumb*

| Weight Percent Concentration of Silica-Containing Silicone | Percent Increase in Particle Size |
|---|---|
| 0.03 | 4.0 |
| 0.06 | 7.5 |
| 0.10 | 7.4 |
| 0.50 | 0.0 |
| 1.0 | 7.7 |
| 1.5 | 9.7 |

The data in the foregoing table show clearly the optimum concentration of silica-containing silicone is about 0.5 weight percent.

In Table III data are presented showing that the presence of a silica-containing silicone in the prescribed amount has substantially no effect on the physical properties of the resulting crumb. Table III compares the physical properties of an untreated Synpol 1012 crumb with the physical properties of a Synpol 1012 crumb containing 0.5 weight percent of the silica-containing silicone employed in Table II.

TABLE III

*Comparison of Properties of Untreated Crumb With a Crumb Treated With Silica-Containing Silicone*

|  | Untreated Crumb | Crumb Containing 0.5 w. percent silica-containing Silicone |
|---|---|---|
| 25% Modulus | 600 | 600 |
| 50% Modulus | 920 | 950 |
| 100% Modulus | 1,190 | 1,200 |
| Tensile | 2,800 | 2,910 |
| Elongation | 600 | 580 |

The data in Table III prove that the presence of the silica-containing silicone has substantially no effect on the physical properties of the crumb. In addition, it was observed that the presence of the silica-containing silicone did not effect appearance of the crumb nor discolor solutions prepared by dissolving the crumb in a solvent.

The specificity of silica-containing silicone in forming stable crumb rubber was further demonstrated by the evaluation of a large number of other non-adhesive agents in the above-descibed tests. The following materials were substantially less effective than talc in producing a non-adhesive stable crumb rubber despite the fact a wide concentration range was investigated: polyethylene glycols of varying average molecular weight, aluminum sulfate, magnesium sulfate, fatty acid soaps such as stearic acid, polystyrene fines, sodium salts of alkyl sulfates such as sodium lauryl sulfate, high styrene content non-tacky styrene-butadiene copolymers such as Marbon 8000 and metallic ink fines such as RP-75.

Obviously, many modifications and variations of the invention as hereinbefore set forth may be made without departing from the spirit and scope thereof and, therefore, only such limitations should be imposed as are indicated in the appended claims.

We claim:

1. A stable non-adhesive butadiene-styrene crumb rubber prepared by polymerization with a fatty acid soap emulsifying agent containing 0.01 to 1.5 weight percent polymeric organic silicon oxide condensation product having dispersed therein 5 to 25 weight percent finely-divided silica said silicon oxide condensation product having the general formula

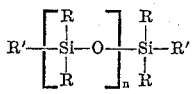

wherein R is an organic radical, R' is selected from the group consisting of hydroxyl radicals and organic radicals and $n$ is an integer having a value of at least 1.

2. A stable butadiene-styrene crumb rubber according to claim 1 containing 0.1 to 1.0 weight percent of said silica-containing polymeric organic silicon oxide condensation product.

3. A stable butadiene-styrene crumb rubber according to claim 1 in which said finely-divided silica constitutes 10-20 weight percent of said polymeric organic silicon oxide condensation product.

4. A stable butadiene-styrene crumb rubber according to claim 1 in which said silica component of said silica-containing polymeric organic silicon oxide condensation product has an average particle size between 0.01 and 0.1 micron.

5. A stable butadiene-styrene crumb rubber according to claim 1 containing 0.5 weight percent of a silica-containing dimethyl silicon oxide condensation product, said silica having an average particle size of about 0.02 micron and constituting 15 weight percent of said silica-containing silicon oxide condensation product.

6. A process for producing a stable non-adhesive butadiene-styrene crumb rubber which comprises treating a styrene-butadiene crumb produced by polymerization with a fatty acid soap emulsifying agent with 0.01 to 1.5 weight percent of a polymeric organic silicon oxide condensation product containing 5 to 25 weight percent of finely-divided silica said silicon oxide condensation product having the general formula

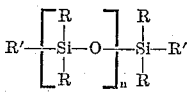

wherein R is an organic radical, R' is selected from the group consisting of hydroxyl radicals and organic radicals and $n$ is an integer having a value of at least 1.

7. A process according to claim 6 in which said silica-containing polymeric organic silicon oxide condensation product is applied to said styrene-butadiene crumb in the form of an aqueous emulsion during washing of said crumb.

8. A process according to claim 6 in which said silica-containing polymeric organic silicon oxide condensation product is sprayed onto said crumb rubber during drying.

9. A process according to claim 6 in which 0.1 to 1.0 weight percent of said silica-containing polymeric organic silicon oxide condensation product is applied to said styrene-butadiene crumb.

10. A process according to claim 6 in which said silica constitutes 10-20 weight percent of said polymeric organic silicon oxide condensation product and has an average particle size between 0.01 and 0.1 micron.

11. A process according to claim 6 in which a polymeric organic silicon oxide condensation product containing 15 weight percent silica having an average particle size of about 0.02 micron is applied in the form of a 35 weight percent aqueous emulsion during washing of said crumb in a concentration equivalent to 0.5 weight percent of said crumb rubber.

References Cited in the file of this patent

UNITED STATES PATENTS

| 2,891,923 | Phreaner | June 23, 1959 |
| 2,940,947 | Welch | June 14, 1960 |

OTHER REFERENCES

Noble: Latex in Industry (2nd edition) 1953, pages 185–193.

Hackh's: Chemical Dictionary, Grant (3rd edition) 1957, page 772,